(12) United States Patent
Nebesni

(10) Patent No.: US 9,027,244 B2
(45) Date of Patent: May 12, 2015

(54) METHOD FOR REPAIRING ROTOR BLADES

(75) Inventor: Josef Nebesni, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 275 days.

(21) Appl. No.: 13/704,964

(22) PCT Filed: May 30, 2011

(86) PCT No.: PCT/EP2011/002671
§ 371 (c)(1),
(2), (4) Date: Dec. 17, 2012

(87) PCT Pub. No.: WO2011/157354
PCT Pub. Date: Dec. 22, 2011

(65) Prior Publication Data
US 2013/0091704 A1 Apr. 18, 2013

(30) Foreign Application Priority Data

Jun. 17, 2010 (DE) .......................... 10 2010 024 083

(51) Int. Cl.
*B23P 6/00* (2006.01)
*B23K 26/342* (2014.01)
(Continued)

(52) U.S. Cl.
CPC .............. *B23P 6/00* (2013.01); *Y10T 29/49318* (2015.01); *B23K 26/0823* (2013.01);
(Continued)

(58) Field of Classification Search
CPC ....... B22F 3/008; B22F 5/04; B23K 15/0006;
B23K 15/002; B23K 15/0086; B23K 26/0823;
B23K 26/083; B23K 26/14; B23K 26/34;
B23K 26/345; B23K 2201/001; B23P 6/002;
B23P 6/007; B23P 6/045; F01D 5/005

USPC .................... 29/889.1, 889.2, 889.23, 889.7,
29/889.72–889.722, 402.01, 402.09,
29/402.11, 402.16, 402.18, 402.19,
29/402.21; 228/119
See application file for complete search history.

(56) References Cited

U.S. PATENT DOCUMENTS

| 5,233,150 | A | 8/1993 | Schneebeli et al. |
| 6,269,540 | B1 | 8/2001 | Islam et al. |

(Continued)

FOREIGN PATENT DOCUMENTS

| DE | 102008056336 | 5/2010 |
| EP | 0496181 | 7/1992 |
| EP | 0558053 | 9/1993 |

OTHER PUBLICATIONS

Canadian Office Action dated Feb. 18, 2014 from counterpart App No. 2,802,755.
German Search Report dated Mar. 28, 2011 from counterpart application.
Intermitional Search Repott dated Aug. 29, 2011 from related PCT application.

(Continued)

*Primary Examiner* — Alexander P Taousakis
*Assistant Examiner* — Matthew P Travers
(74) *Attorney, Agent, or Firm* — Timothy J. Klima; Shuttleworth & Ingersoll, PLC

(57) ABSTRACT

In a method for repairing worn or damaged rotor blades of an aircraft engine, laser cladding for the reconstruction of the blade tips is not performed in a continuous welding process along the blade edge but during a cycle-by-cycle rotation of the rotor blades attached to a rotor disk, in only one limited section of the respective blade edge for each cycle. The method reduces time expenditure for the repair of the blades and improves the tribological properties of the blade material in the area of the repaired blade tip.

5 Claims, 1 Drawing Sheet

(51) Int. Cl.
*F01D 5/00* (2006.01)
*B23K 26/08* (2014.01)
*B23K 26/14* (2014.01)
*B23K 26/34* (2014.01)
*B23K 26/32* (2014.01)
*B23K 35/02* (2006.01)

(52) U.S. Cl.
CPC .............. *B23K 26/14* (2013.01); *B23K 26/345* (2013.01); *B23K 2201/001* (2013.01); *B23P 6/007* (2013.01); *F01D 5/005* (2013.01); *F05D 2230/234* (2013.01); *F05D 2230/31* (2013.01); *B23K 26/3293* (2013.01); *B23K 35/0244* (2013.01)

(56) References Cited

U.S. PATENT DOCUMENTS

| | | | |
|---|---|---|---|
| 6,326,585 | B1 | 12/2001 | Aleshin et al. |
| 2006/0193612 | A1 | 8/2006 | Bouet et al. |
| 2008/0173624 | A1 | 7/2008 | Drechsler et al. |
| 2008/0182017 | A1 | 7/2008 | Singh et al. |
| 2010/0106285 | A1* | 4/2010 | Massey .................. 700/212 |
| 2011/0217457 | A1 | 9/2011 | Huttner et al. |

OTHER PUBLICATIONS

English translation of International Search Report and Written Opinion from related PCT application.

* cited by examiner

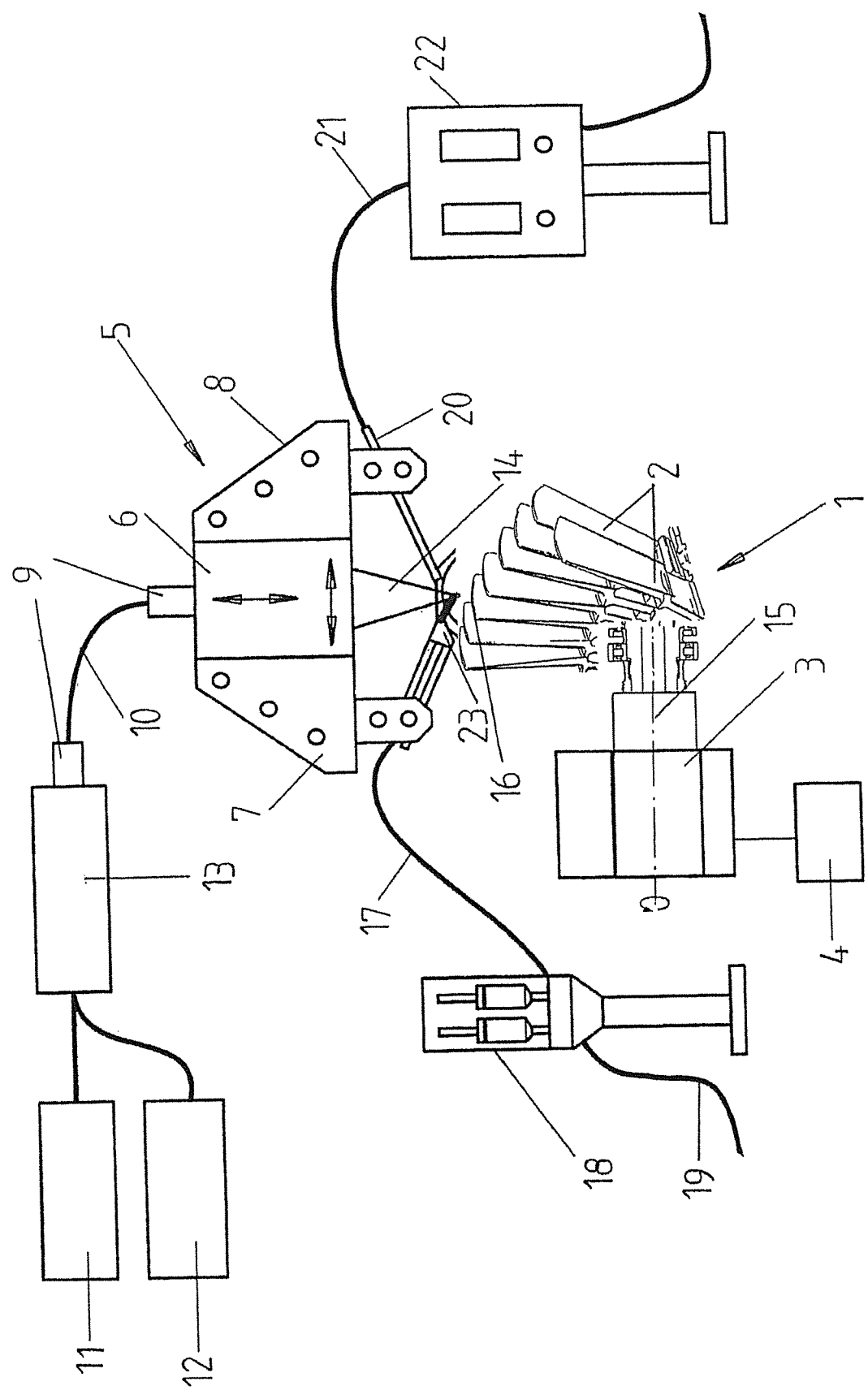

METHOD FOR REPAIRING ROTOR BLADES

This application is the National Phase of International Application PCT/EP2011/002671 filed May 30, 2011 which designated the U.S. and that International Application was published under PCT Article 21(2).

This application claims priority to German Patent Application No. 102010024083.4 filed Jun. 17, 2010 and PCT Application No. PCT/EP2011/002671 filed May 30, 2011 which applications are incorporated by reference herein.

This invention relates to a method for repairing rotor blades of a gas turbine, in particular of an aircraft engine, where the damaged portion of the blade tip is removed and then reconstructed by laser cladding and finally finish-machined.

In laser cladding, material is deposited by melting the surface of the workpiece and simultaneously applying a filler material provided in powder form or as a welding wire. The highly stressed and expensive blades of an engine, both blades integrally connected to the rotor disk and separate blades attached conventionally to the rotor disk, can be repaired inexpensively by laser cladding when the blade tips are worn or damaged. First, the damaged or worn part is mechanically removed from the blade tip. Then the blade tip is locally melted along the edge or approximately in the direction of the rotational axis of the rotor disk using a $CO_2$ or Nd:YAG laser, and the melted area is supplied with a metal powder mixed with an inert gas and which fuses with the melted basic material. In this way, one material layer after the other is applied along the tip of the respective rotor blade until the original blade dimension is attained. This method is disadvantageous in that a large amount of thermal energy is imparted into the component due to the separate coating of every single blade, and a correspondingly high thermal distortion of the blade occurs. The high application rates necessary to perform the method also entail high expenditure for mechanical reworking, while the stress resistance and hardness of the applied coating are reduced with a higher coating thickness of the filler material applied by laser cladding.

The object underlying the present invention is to indicate a method for repairing rotor blades worn or damaged at their tips by laser cladding, requiring a reduced work expenditure and providing repaired blades of high quality.

The basic idea of the invention is that laser cladding for reconstructing the blade tips does not take place in a continuous welding process along the blade edge, but during a cycle-by-cycle rotation of the rotor blades attached to a rotor disk at only one limited section of the respective blade edge for each cycle. This means that by the method in accordance with the invention, the rotor with the rotor blades fastened thereto detachably or in one piece is rotated step by step, and while the rotor is stationary the respective rotor blade currently underneath a stationary laser-cladding unit is heated and melted at its tip in a limited area using a laser beam generated in a certain time interval, and coated point by point with a metal powder flow supplied in a certain time interval. This process is repeated after every rotation of the rotor disk and every horizontal adjustment of the laser-cladding unit until the blade tips of all rotor blades have been coated, point by point and coating by coating in a plurality of individual welding steps, over the entire length of the blade edges and finally up to the necessary blade height, and after the laser-cladding unit has in the meantime been adjusted vertically upwards for application of a further material coating. The advantages of the method are reduced time expenditure for the repair of rotor blades and improved tribological properties of the blade material in the area of the repaired and highly stressed blade tips.

In an embodiment of the invention, inert gas is supplied continuously or discontinuously during discontinuous and point-by-point laser cladding.

An exemplary embodiment of the present invention is described in greater detail in light of the drawing, whose only one FIGURE represents an arrangement for repairing the tips of rotor blades of a gas-turbine engine.

A rotor 1 with rotor blades 2 attached to its circumference is connected to a drive unit 3 that causes the rotor 1 to perform a step-by-step rotary movement with the aid of a control unit 4 connected to the drive unit 3. The damaged or worn portion of the blade tips was previously removed in a machining process. The coating of the blades 2 thus prepared on the blade tips 16 is achieved by laser cladding using a horizontally and vertically adjustably arranged laser-cladding unit 5 including laser optics 6, a coating head 7 and an inert gas head 8. The laser optics 6 are connected via glass fiber plugs 9 and a glass fiber 10 to a laser unit 13 connected to a laser cooler 11 and a laser control 12. A laser beam 14 is aimed by the laser optics 6 at a point of the blade tip 18 extending approximately in the direction of the rotational axis 15 of the rotor 1 and currently located underneath the laser optics 6.

A powder nozzle 23 fastened to the coating head 7 is connected via a powder gas hose 17 to a powder conveyor 18 which is connected via a conveying gas hose 19 to a gas source (not shown). The metal powder conveyed by the gas is supplied via the powder nozzle 23 to the molten bath generated by the laser beam 14 at the blade tip 16 in order to achieve in this way an approximately point-by-point material deposition at the blade tip. A inert gas nozzle 20 attached to the inert gas head 8, aimed at the molten bath at the blade tip and connected via an inert gas line 21, having an inert gas volume flow measuring device 22 incorporated therein, to an inert gas source (not shown) ensures material deposition in an inert gas atmosphere.

During coating of the blade tips 16, the rotor 1 with the blades 2 attached to its circumference is rotated step by step. When a blade tip is underneath the laser optics 6 in an idle state, a laser beam 14 is generated at a certain time interval, said laser beam effecting selective melting in a limited area of the appropriate blade tip. The molten bath is supplied with a limited amount of powder—while inert gas is supplied at the same time—via the powder nozzle 23. By a cycle-by-cycle rotation of the rotor, the other blade tips too are coated in the manner described above in a limited area of the respective blade tip. Then the laser-cladding unit 5 is moved horizontally, and that area of the blade tip adjacent to the previously coated area is coated point by point using laser cladding in each case. This process is repeated until a continuous first material coating has been applied over the entire length of all blade tips. Then the laser-cladding unit 5 is moved vertically upwards and—as previously described—further coatings are applied until the original blade height has been reached with an allowance for subsequent machining.

Due to the discontinuous and point-by-point coating conducted in a step-by-step rotary movement, in each case only small heat effect zones are generated in the blade material. The low amount of heat imparted to the blade minimizes distortion of the workpiece. The small heat effect zones furthermore result in steep temperature gradients and accordingly high cooling rates, leading to greater hardness of the applied material coating and hence an improved friction and wear behaviour of the blades. In addition, the time spent for laser cladding and for reworking of the coated blades is reduced.

LIST OF REFERENCE NUMERALS

1 Rotor, rotor disk
2 Rotor blades

3 Drive unit
4 Control unit of 3
5 Laser-cladding unit
6 Laser optics
7 Coating head
8 Inert gas head
9 Glass fiber plug
10 Glass fiber
11 Laser cooler
12 Laser control
13 Laser unit
14 Laser beam
15 Rotational axis of 1
16 Blade tip
17 Powder gas hose
18 Powder conveyer
19 Conveying gas hose
20 Inert gas nozzle
21 Inert gas line
22 Inert gas volume flow measuring device
23 Powder nozzle

What is claimed is:

1. A method for repairing rotor blades of an aircraft gas turbine, comprising:
   removing a damaged portion of a rotor blade tip of each of a group of selected of rotor blades of a rotor, the rotor blades fastened to the rotor at least one chosen from detachably and in one piece;
   reconstructing the damaged portion of the rotor blade tip of each of the group of selected rotor blades by laser cladding as follows:
   rotating the rotor to index the selected rotor blades to a laser-cladding unit;
   using a laser beam from the laser-cladding unit to heat and melt corresponding limited areas of tips of the rotor blades as each selected rotor blade is indexed at the laser-cladding unit, the laser beam being generated in a first certain time interval for each selected rotor blade, the certain limited areas individually being areas less than an entire length of the blade tip;
   supplying a metal powder flow in a second certain time interval to the heated and melted corresponding limited areas as each selected rotor blade is indexed at the laser cladding unit to coat the tip of the indexed rotor blade in the corresponding limited area;
   rotating the rotor to index a further selected rotor blade to the laser-cladding unit and repeating above steps to coat the corresponding limited area of the tip of each selected rotor blade;
   repositioning the laser beam with respect to the rotor to heat and melt further corresponding limited areas along lengths of the tips of the selected rotor blades and repeating above steps until a desired length of the tip of each selected rotor blade is coated;
   repositioning the laser beam radially outwardly with respect to the rotor to heat and melt further corresponding limited areas along lengths of the tips of the selected rotor blades and repeating above steps until the tip of each selected rotor blade is coated to a desired blade height;
   finish machining the rotor.

2. The method of claim 1, and further comprising supplying inert gas during discontinuous and point-by-point laser cladding, the inert gas being supplied at least one chosen from continuously and discontinuously.

3. The method of claim 2, wherein the corresponding limited areas are set sufficiently small to cause a point-by-point laser cladding of the rotor blades.

4. The method of claim 1, wherein the corresponding limited areas are set sufficiently small to cause a point-by-point laser cladding of the rotor blades.

5. A method for repairing rotor blades of an aircraft gas turbine, comprising:
   removing damaged portions of rotor blade tips of a rotor;
   reconstructing the damaged portions by laser cladding as follows:
   rotating the rotor step by step to circumferentially index respective limited areas of the rotor blade tips underneath a laser-cladding unit, and while the rotor is stationary, heating and melting the respective limited area of one of the rotor blade tips using a laser beam generated in a first certain time interval;
   supplying a metal powder flow in a second certain time interval to the heated and melted respective limited area to thereby coat the respective limited area;
   rotating the rotor to index a further selected rotor blade to the laser cladding unit and repeating above steps to coat the respective limited area of the tip of each selected rotor blade;
   repositioning the laser beam with respect to the rotor to heat and melt further respective limited areas along lengths of the tips of the selected rotor blades and repeating above steps until a desired length of the tip of each selected rotor blade is coated;
   repositioning the laser beam radially outwardly with respect to the rotor to heat and melt further respective limited areas along lengths of the tips of the selected rotor blades and repeating above steps until the tip of each selected rotor blade is coated to a desired blade height;
   finish machining the rotor.

* * * * *